Feb. 27, 1968 D. G. ADLER ETAL 3,371,329

AIR BEARING MAGNETIC MEMORY DEVICE

Filed July 13, 1965

INVENTORS
DAVID G. ADLER
RAYMOND J. STANKIEWICZ

BY

AGENT

United States Patent Office 3,371,329

Patented Feb. 27, 1968

3,371,329

AIR BEARING MAGNETIC MEMORY DEVICE

David G. Adler, Drexel Hill, and Raymond J. Stankiewicz, Philadelphia, Pa., assignors to Sperry Rand Corporation, New York, N.Y., a corporation of Delaware Filed July 13, 1965, Ser. No. 471,636

4 Claims. (Cl. 340—174.1)

Figure 1:
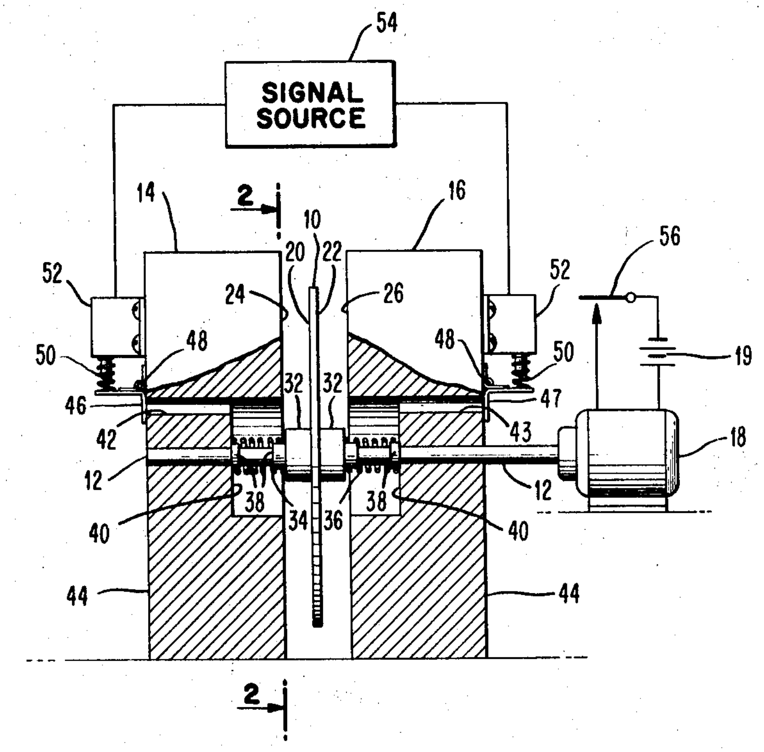

The invention hereinafter described and claimed has to do with magnetic memory systems, but more particularly to such a system utilizing a flying disc characterized by its self-adjustability relative to magnetic transducers positioned adjacent its opposite sides whereby both sides of the disc may be employed for the storage and use of magnetically recorded information. With still more particularity the invention relates to a magnetic recording system such as disclosed in the co-pending Thomas et al. patent application Ser. No. 109,222, filed May 10, 1961, now U.S. Patent No. 3,248,737 for "Self-Stabilizing Mechanical System," and assigned to the assignee of the present invention.

In the magnetic recording art, it is well recognized that optimum performance, with respect to reading, writing and erasing, is obtained when the magnetic transducer head is positioned as close as possible to the surface of the magnetic record. In so positioning the transducer head, however, certain difficulties are encountered. For instance, if the system is to be designed for minimum wear the transducer head should not be positioned so that it rides against or comes into physical contact with the surface of the magnetic record. Therefore, if the transducer head is firmly positioned with respect to a rotating disc or drum, the disc or drum must rotate with no eccentric movement or deviation from its axis. In order to attain such "true" rotation, the drum or the disc must be very precisely mounted.

Since precision mountings are costly, some attempt has been made to provide a transducer head mounting piece which can be physically adjusted with respect to the magnetic record or the rotating disc. For instance transducer head mounting pieces have been attached to metal straps which can be formed or bent and thereafter the metal straps have been adjusted to locate the transducer heads in close proximity to the rotating disc (magnetic record). Obviously such an arrangement has undesirable aspects. For instance, there are the practical limits of adjusting a plurality of heads in equal relationship to the magnetic record, and the realignment of the mounting pieces whenever one magnetic record is interchanged with another magnetic record.

In the above identified co-pending application, a magnetic memory system is provided wherein a rigid flying magnetic disc is arranged in a manner utilizing the Bernoulli effect to adjust itself into operative relation to transducers adjacent one side of the disc during operation of the system, and to move away from the transducer for non-operative conditions.

It is the primary object of the present invention to provide an improved magnetic recording system utilizing the Bernoulli effect in a manner whereby both sides of a disc may be used for magnetic storage and wherein the disc is selectively self-adjusting relative to transducers positioned on the opposite sides of the disc.

In accordance with the above and first briefly decribed in connection with the preferred embodiment of the invention, a flat rotating or "flying" disc is closely positioned between a pair of fixed members having flat faces opposing the opposite sides of the disc with an interspace between them. Means is provided to control the flow of air in the interspace such that a partial vacuum may be formed selectively between either one of the fixed members and the disc causing the disc to move toward the selected fixed member. In this manner the disc may be moved into closely spaced operative relation with magnetic transducers carried on either of the opposing faces of the fixed plates in any order or sequence.

Figure 2:
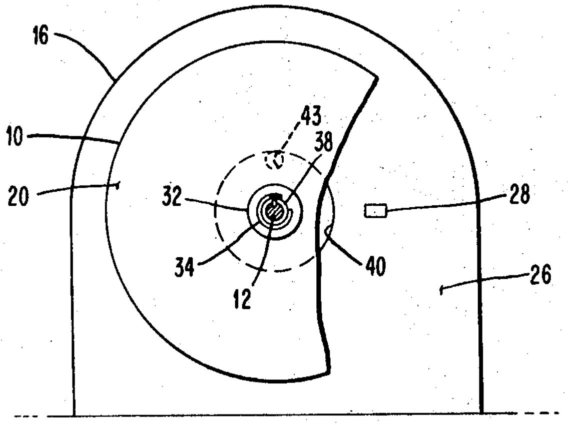

In the drawings:

FIGURE 1 is an elevational view of the invention partially in section and partially broken away more clearly to shown its construction; and FIGURE 2 is a sectional view taken along the line 2—2 of FIGURE 1.

If a disc is rotated the air coming in contact with its surfaces adopts the rotational movement of the disc by virtue of the frictional drag between the disc surfaces and the fluid. When the disc has attained sufficient velocity the momentum of the fluid will cause it to leave the surface of the disc in a tangential direction providing a partial vacuum thereat. In the present invention this pumping action creates a differential of pressure in the interspace between the surface of the disc and the selected fixed member.

In FIGURE 1, a magnetizable recording disc 10 is rotatably and translationally mounted on a shaft 12 journalled in a pair of fixed member 14 and 16 and driven by a motor 18 connected to a power source 19. The disc has opposite co-planar flat surfaces 20 and 22 facing flat co-planar faces 24 and 26 respectively on the fixed members.

As seen in FIGURE 2, suitable magnetic transducers 28 are mounted in the fixed members 14 and 16 with their pole faces preferably flush with their planar faces 24 and 26. Only one transducer has been shown by way of example, but it is understood that any desired number of them may be provided. Also seen in this figure is the key 30 fixing the disc to the shaft 12 for rotation therewith, yet permitting sliding axial (translational) movement thereof on the shaft toward either face 24 or 26.

Returning to FIGURE 1, it is seen that the hub 32 of the disc has its opposite ends reduced in diameter to be received in the inner ends by light compression springs 34 and 36. The other ends of the springs terminate over bosses 38 on the bottom walls of recesses 40 formed in the fixed members 14 and 16 to receive the hub 32 when the disc moves toward them. The springs cooperate normally to urge the disc to a neutral position midway between the members 14 and 16.

Channels or passageways 42 and 43 extend through the fixed members 14 and 16 from their back walls 44 to the recesses 40 whereby air may flow into the recesses during one phase of operation, as described hereinafter. Air flow through these channels is controlled by valves 46 and 47 pivotally mounted at 48 on the back wall 44 of each member 14 and 16 and normally closed by a light spring 50. Each valve is operable to its open condition by an electromagnet 52 fixed to the back wall 44 of each member, and controlled from a suitable source of signals 54, such as a computer.

It will be understood that the opposing faces of the disc and the fixed members are relatively close for instant response to signals from source 54 as now to be described.

In its operation, current is supplied to motor 18 by closing switch 56 to bring the disc up to operating speed. With both of the valves 46 open or closed the conditions on both sides of the disc are balanced and the disc remains in its neutral position equally spaced from both faces 24 and 26 of members 14 and 16.

Now, as reading or writing operations are signalled from source 54, one or the other of the valves 46 and 47 is opened by energizing its associated electro-magnet 52. For the purpose of this description, let it be considered that it is valve 47. Air then flowing through channel 43 produres a pressure differential across the disc causing it to move against the light pressure of spring 34 toward the opposite fixed member 14 whereby the opposing faces of the disc and the members, 22 and 24 respectively, are in operative relation with each other. Yet, because of the pumping effect (Bernoulli), the disc reaches a state of equilibrium. That is, the rotating disc causes a partial vacuum at the center of the disc and an increase in pressure between the disc and face 24 of fixed member 14 at the outer regions of the disc. Thus the disc is rotating on a thin film of air in operative relation with the transducers in face 24 but without contact with the face.

When it is desired to effect a read or write operation on the other side of the disc, valve 46 is opened and valve 47 closed thus to reverse the pressure differential causing the disc to slide on shaft 12 toward fixed member 16 to place disc face 22 in operative relation with face 26 of fixed member 16.

It will be understood that the fixed members are best closely spaced relative to the disc so that response to the opening and closing of valves 46 and 47 is rapid whereby information may be written on or read successively from the opposite faces of the disc when desired with minimum loss of time.

To cease operation both valves may be opened to eliminate the pressure differential between the disc and fixed member. The disc then moves to its neutral position as urged by springs 34 and 36.

The system, of course, is reversable. That is, the disc could be made the fixed member, and the fixed members made the axially movable rotatable members. In this case the valve controlled fluid conduits can be in either the fixed or the movable members.

The embodiments of the invention in which an exclusive property or privilege is claimed are defined as follows:

1. A self-adjusting magnetic memory device comprising:

(A) first and second members mounted in closely spaced relation and having opposing planar faces;

(B) a third member mounted between said first and second members and having opposite planar faces opposing those of said first and second member;

(C) means for effecting relative rotational and translational movement between said first and second members and said third member;

(D) means biasing said members translationally to inoperative positions whereby an interspace is provided between each of said first and second members and said third member;

(E) magnetic transducer means mounted in one of said opposing planar faces at each interspace with their pole faces substantially co-planar with said faces, the other of said opposing planar faces being magnetic;

(F) fluid conduit means extending through at least one of said members from each interspace to ambient air;

(G) valve means for opening and closing each of said conduit means selectively; and (H) means for controlling said valve means in a manner whereby a pressure differential is selectively effected in one of said interspaces by said relative rotational movement to cause relative translational movement between one of said first and second members and said third member, one toward the other, whereby the relative rotational movement in the operative position relative to the transducer means and the magnetic face in the selected interspace is on a cushion of air.

2. A self-adjusting magnetic memory device comprising:

(A) a pair of members fixed in closely spaced relation and having opposing planar faces in parallel planes;

(B) magnetic transducers mounted in each of said members with their pole faces substantially co-planar with said faces;

(C) a fluid conduit extending through each of said members from its planar face to another surface exposed to ambient air;

(D) valve means for opening and closing said conduits selectively;

(E) a magnetic disc having opposite planar faces;

(F) means mounting said disc between said pair of members for rotational and translational movements with its faces parallel to the planar faces of said members;

(G) means biasing said disc translationally to an inoperative position between said members;

(H) means for rotating said disc; and (I) means for controlling said valves in a manner whereby a pressure differential is effected across said disc by its rotation to cause translational movement thereof toward one of said fixed members to rotate on a cushion of air with one face in operative position relative to the transducers in the opposing face of said one fixed member.

3. A self-adjusting magnetic memory device comprising:

(A) a pair of members fixed in closely spaced relation and having opposing planar faces in parallel planes;

(B) magnetic transducers mounted in each of said members with their pole faces substantially co-planar with said faces;

(C) a fluid conduit extending through each of said members from its its planar face to another surface exposed to ambient air;

(D) valve means for opening and closing said conduits selectively;

(E) a disc having opposite planar magnetic faces;

(F) means mounting said disc between said pair of members for rotational and translational movements with its faces parallel to the planar faces of said members and with an interspace therebetween;

(G) biasing means to urge said disc translationally to an inoperative position midway between said members;

(H) means for rotating said disc; and (I) means for opening one of said valves and closing the other whereby the pressure in one of said interspaces is reduced by the rotation of said disc to effect a pressure differential across said disc causing translational movement thereof toward the fixed member having the closed valve whereby the disc rotates on a cushion of air in operative position relative to the transducers in the face of the last mentioned fixed member.

4. A construction according to claim 3 wherein:

(A) the means mounting said disc comprises a shaft journalled in said fixed members, said disc being mounted on said shaft for slidable translational movement toward either of said fixed members; and (B) said biasing means comprises a pair of light compression springs carried on said shaft, one on each side of said disc.

References Cited

UNITED STATES PATENTS

| | | | |
|---|---|---|---|
| 3,303,485 | 2/1967 | Lee ------------ | 340—174.1 |
| 3,060,433 | 10/1962 | Lee et al. ---------- | 179—100.2 |

BERNARD KONICK, *Primary Examiner.*

A. I. NEUSTADT, *Assistant Examiner.*